Dec. 2, 1947.     G. DAVIDSON     2,431,993
ALKALI-TREATING VEGETABLE PROTEIN
Filed May 25, 1943
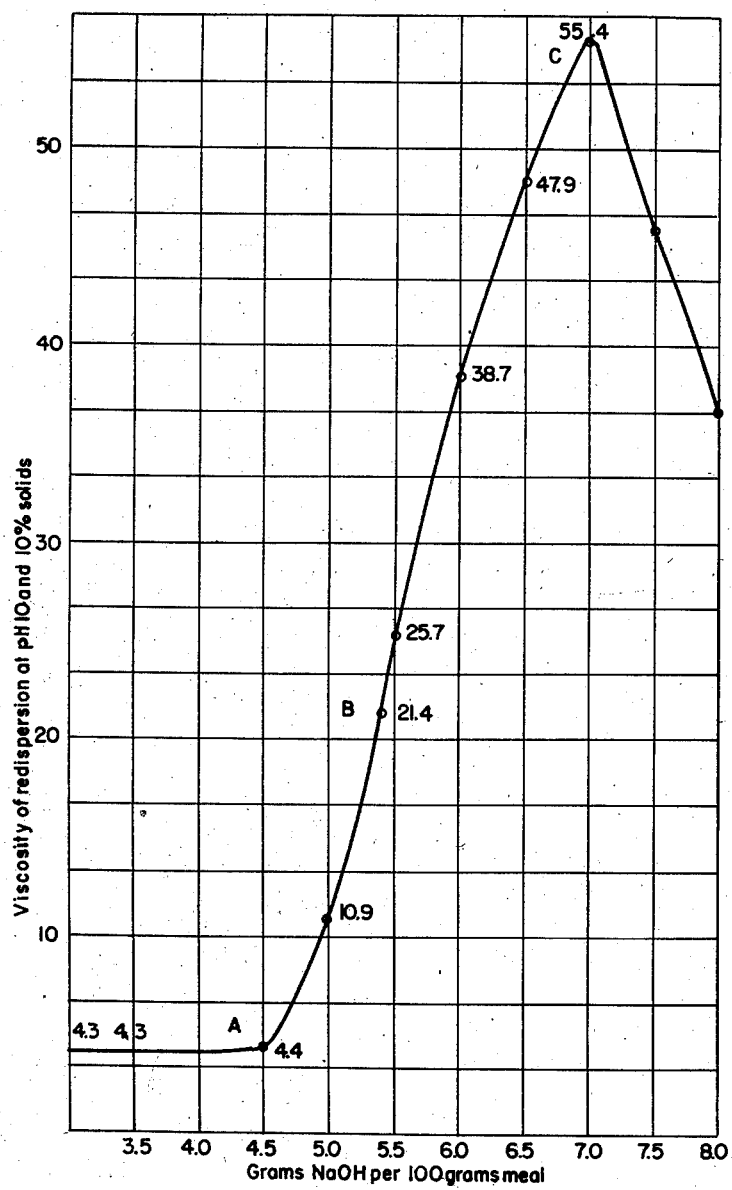
INVENTOR.
GLENN DAVIDSON
BY
Oberlin, Limbach & Day
ATTORNEYS Patented Dec. 2, 1947

2,431,993

UNITED STATES PATENT OFFICE 2,431,993

ALKALI-TREATING VEGETABLE PROTEIN

Glenn Davidson, Aurora, Ill.

Application May 25, 1943, Serial No. 488,382

18 Claims. (Cl. 260—112)

The general procedure by which an isolated protein is prepared from an oil-seed meal or other protein-containing substance customarily includes the following steps:

1. Solution of the protein in an aqueous alkali.
2. Separation of the material insoluble in aqueous alkali, as by centrifuging, filtering, screening, or foaming.
3. Precipitation of the protein by acidification of the clarified alkaline protein solution to the iso-electric point of the protein, usually about pH 4.8.
4. Washing and drying the protein curd.

Due to considerable difficulty involving separating the insoluble material commonly a considerable time is consumed between step 1 and step 3, and during this delay the alkali is progressively acting on the protein, resulting in the modification of its properties, particularly its viscosity and curd characteristics. I have found that there is a peculiar relation between alkali ratio to protein as employed in step 1 or acting on the protein prior to precipitation and the curd character of the precipitated protein which will occur in step 3 and the viscosity of the ultimately resulting product from step 4, and that there are certain critical factors which if observed will expedite the processing with a precipitate which is particularly favorable for handling, and result in a finished product which when redispersed for use shows superior viscosity properties together with greatly improved adhesive and other desirable characteristics.

To the accomplishment of the foregoing and related ends, the invention, then, comprises the features hereinafter fully described, and particularly pointed out in the claims, the following description and accompanying drawing setting forth in detail certain illustrative embodiments of the invention, these being indicative, however, of but a few of the various ways in which the principle of the invention may be employed.

In said annexed drawing:

The sole figure is a graph showing the curve of behavior of vegetable protein with respect to critical amounts of alkali ratios.

If a vegetable protein-containing material, such as meal or ground residue after extraction of oil in soya beans, peanuts, etc., is treated with caustic alkali such as sodium hydroxide solution in samples providing a series of progressive alkali ratios, the protein is dissolved out, and if to the solutions as separated from the non-protein residue acid be added as in the above-noted step 3, the protein is precipitated. While protein is thus obtained from differing ratios, there is quite a variation in the character of the precipitated protein. And I have found that there is a characteristic vegetable protein behavior relative to caustic alkali range, in which the protein first through quite extended lower alkali-ratios for extracting, when ultimately treated in the precipitating stage comes down in a finely divided and sticky form, while thence in a certain higher range of alkali ratios the precipitate is in a more integrated and curdy condition; and, the final product of above-noted step 4 when redispersed shows also a correlated viscosity character. This takes the form of a typical curve, when alkali-amount and viscosity are plotted. Referring to the graph shown in the drawing herewith, there is illustrated such a curve as obtained under standardized conditions. In this, dried soya bean meal, ground from extracted soya beans, was sampled into a series of laboratory lots in which progressively increasing amounts of alkali were applied in the dissolving of the above-noted step 1, the amounts of NaOH per 100 grams of the dry protein-containing meal being indicated below, and the viscosity, in centipoises, of the redissolved dried protein curd from above-noted step 4 being the ordinates. As here shown, the viscosity is practically uniform through a range of lower alkali-amounts up to about 4.5 grams of NaOH per 100 grams of dry protein-containing meal. From this point with more alkali an abrupt rise in viscosity sets in, carrying a steep slope up to a viscosity of 55.4 for protein which had been extracted by 7.0 grams NaOH per 100 grams meal. Thence, with further increase of NaOH the viscosity rapidly falls off. Simultaneously, the character of the precipitate in step 3, from these progressively increasing alkali-amounts changes, being finely divided at the beginning up to a point between 4.0 and 4.5 grams of NaOH but thence changing over to an integrated curd, so that from such point up along the slope of the curve an easily handled curd is obtained. The amounts giving the best combination of curd-properties in step 3 and the best viscosity for the product of step 4, involve the range corresponding to the lower half of the rise-slope of the curve, and more particularly about a third the way up, as e. g. about point B on the slope. This curve is characteristic of the behavior of vegetable protein to caustic alkali, and vegetable protein in general conforms to such type curve. The precise amount of alkali to bring any particular specimen protein to the point A however varies slightly with the protein-containing material being dealt with. In other words, the type curve may shift slightly with respect to precise amount of NaOH, but the form of the curve is characteristic and it may be readily located for any material to be treated. This is remarkable, considering that the protein-containing materials operated upon vary in their source, age, etc.

In accordance with the present invention then, I first determine for a particular protein-containing material to be operated upon, the alkali-amounts giving location of the points A, the start of slope rise, and C, top of slope rise, and thence derivatively B as a practical operating basis for the optimum combination of curd properties and ultimate viscosity of the finished product. This is readily accomplished by sampling the material under conditions standardized for the purpose, convenient amounts of the crude protein-containing material e. g. 1000 grams each being sampled in 10 liters of water, at standard temperature, e. g. 70° F., and 30.0, 35.0, 40.0, 45.0, 50.0, 55.0, 60.0, 65.0, 70.0, 75.0, etc., grams of NaOH being to each added respectively in a progressive series of increasing NaOH amounts for step 1, and then a uniform period being allowed to elapse between step 1 and step 3, e. g. 24 hours, the insoluble non-protein sludge being separated out during this time (step 2), and adding diluted $H_2SO_4$ (1:12) to each and precipitating, and collecting and washing and drying the curd, and ultimately dispersing the final product from step 4 by caustic alkali solution giving pH 10 for 10 per cent of solids, and the viscosities being then read on these samples and the results plotted as illustrated in the drawing, or at least sufficient to locate points A and C of the curve with relation to alkali-amount. Having determined the points A and C, the point B is derived, as a practical matter by taking one-third of the value of the slope from A to C, in the illustration $$55.4 - 4.4 = 51.0$$
$$51.0 \div 3 = 17.0$$
$$17.0 + 4.4 = 21.4$$

The amount of alkali corresponding is read off at the base of the curve, viz. 5.37 parts by weight of NaOH per 100 parts of soya meal and this is the amount to be used for the processing. The further procedure involves stirring up the commercial lot of the protein-containing material or meal, e. g. 100 lbs. with 10,000 lbs. of water and adding 53.7 lbs. caustic soda, all conditions, particularly the temperature, mode of separation of the insoluble material in the second step, and the lapse of time between the first and third steps being made to duplicate those used on the laboratory samples. Of course what is actually done in practice is to take account of the plant procedure to be used and then adapt the laboratory factors to correspond. Thus, if the time to be allowed to elapse in the plant between the first and third steps is five hours, rather than twenty-four hours, then five hours is used in running the laboratory lots. Likewise all other conditions prevailing in the plant are duplicated as near as reasonably practicable.

As to the redispersion of the finally dried protein, there is nothing rigid about the pH of 10.0 and the 10 per cent solid used in the above illustration. Any pH high enough to disperse the protein and any percentage of solids that is convenient for the viscosity apparatus at hand may be used. It is important that the viscosity measurements be made under conditions not complicated by turbulent flow. Frequently, the best procedure is to use the pH and the percentage of solids to be used in the final commercial application or use of the protein.

In some instances, it may be desired to carry out step 2 either in the absence of alkali or with amounts which would be too small to reach point A on the curve. In this case, after a desired concentration for dissolving in step 1 I take the clarified liquid coming from step 2 and add sufficient alkali to it to bring the final protein to a point in the lower half of the upward slope of the curve. I determine the amount of alkali required to accomplish this by taking sample portions of the clarified liquid and adding to them a series of various amounts of caustic soda analogous to the above, allowing to stand for at least thirty minutes, preferably two or three hours depending on the temperature or if at approximately 70° F. and if convenient in the plant practice, overnight, then proceeding with the third and fourth steps exactly as above described. From the viscosity determinations made with the samples so obtained, I plot the curve and from it determine the amount of alkali to be used in the plant operation, as described above. Extracting or dissolving out the protein can in such manner be effected by the weak alkaline amounts previously known in the art, but then after having obtained a solution of protein it can be raised in its alkali amount into the range featured by the present invention and thereby attain the resultant advantages.

Other caustic alkalies may of course be used, but sodium hydroxide is especially applicable on account of its favorable cost and handling conditions. Other acids can be used for precipitation, also the dilution of the precipitating acid may be varied, and dilutions for instance of sulphuric acid by 6 to 20 parts of water may be applied.

Curds which are especially favorable for rapid handling in the processing thus now become available, and the finished product has outstanding solubility properties and adhesive characteristics.

Other modes of applying the principle of the invention may be employed, change being made as regards the details described, provided the features stated in any of the following claims, or the equivalent of such, be employed.

I therefore particularly point out and distinctly claim as my invention:

1. In a process of obtaining a protein from vegetable protein-containing material by extracting the material with an aqueous alkali liquid to dissolve out the protein, the steps of correlating curd property in precipitation and viscosity-property in the finished protein product by sampling and ascertaining for soya bean meal to be extracted the range of amounts of alkali per weight of meal extracted for viscosity rise from minimum to maximum, and selecting an alkali-amount corresponding to a point about one-third of such viscosity rise range and extracting the soya bean meal with an aqueous alkali solution of that amount.

2. In a process of obtaining a protein from vegetable protein-containing material by extracting the material with an aqueous alkali liquid to dissolve out the protein, the steps of correlating curd property in precipitation and viscosity-property in the finished protein product by sampling and ascertaining for soya bean meal to be extracted the range of amounts of alkali per weight of meal extracted for viscosity rise from minimum to maximum, and selecting an alkali-amount in the lower half of such viscosity rise range and extracting the soya bean meal with an aqueous alkali solution of that amount.

3. In a process of obtaining a protein from vegetable protein-containing material by extracting leguminous seed-meal material with an aqueous alkali liquid to dissolve out the protein, the steps of correlating curd property in precipitation and viscosity-property in the finished protein product by sampling and determining for a particular material to be extracted a range of amounts of alkali per weight of meal extracted for viscosity rise from minimum to maximum, and selecting an alkali-amount corresponding to a point about one-third of such viscosity rise range and extracting the material with an aqueous alkali solution of that amount.

4. In a process of obtaining a protein from vegetable protein-containing material by extracting leguminous seed-meal material with an aqueous alkali liquid to dissolve out the protein, the steps of correlating curd property in precipitation and viscosity-property in the finished protein product by sampling and determining for the particular material to be extracted the range of amounts of alkali per weight of material extracted for viscosity rise from minimum to maximum, and selecting an alkali-amount in the lower half of such viscosity rise range and extracting the material with an aqueous alkali solution of that amount.

5. In a process of obtaining a protein from vegetable protein-containing material by extracting leguminous seed-meal material with an aqueous alkali liquid to dissolve out the protein, the steps of determining for the particular material the viscosity rise range with relation to increasing alkali-amount per weight of material extracted for dissolving, extracting the material with an alkaline liquid of low amount per weight of material extracted and separating the protein solution from undissolved residue, then adding alkali to the solution to raise the alkali-amount to correspond to a point about one-third up the ascertained viscosity rise range, and precipitating the protein from such solution.

6. In a process of obtaining a protein from vegetable protein-containing material by extracting leguminous seed-meal material with an aqueous alkali liquid to dissolve out the protein, the steps of determining for the particular material the viscosity rise range with relation to increasing alkali amount per weight of material extracted for dissolving, extracting the material with an alkaline liquid of low amount per weight of material extracted and separating the protein solution from undissolved residue, then adding alkali to the solution to raise the alkali-amount within the lower half of the ascertained viscosity rise range, and precipitating the protein from such solution.

7. In a process of obtaining a protein from vegetable protein-containing material by extracting leguminous seed-meal material with an aqueous alkali liquid to dissolve out the protein, the steps of determining for the particular material the viscosity rise range with relation to increasing alkali-amount per weight of material extracted, extracting and forming a solution of the protein from the material, and finally precipitating the protein from the solution wherein the amount of alkali is adjusted into the lower half of such viscosity rise range.

8. In a process of obtaining a protein from vegetable protein-containing material by extracting leguminous seed-meal material with an aqueous alkali liquid to dissolve out the protein, the step of extracting the material with an amount of alkali per weight of material extracted adjusted to correspond to a point about one-third of the viscosity rise range identified for that material.

9. In a process of obtaining a protein from vegetable protein-containing material by extracting leguminous seed-meal material with an aqueous alkali liquid to dissolve out the protein, the step of extracting the material in the lower half of the viscosity rise range identified for that material.

10. In a process of obtaining a protein from vegetable protein-containing material by extracting leguminous seed-meal material with an aqueous alkali liquid to dissolve out the protein, the step of finally precipitating the protein from solution adjusted in alkali amount per weight of material extracted to within the lower half of the viscosity rise range identified for that material.

11. In a process of obtaining protein from vegetable protein-containing material by extracting leguminous seed-meal material with an aqueous alkali liquid to dissolve out the protein, correlating curd property in precipitation and viscosity-property in the finished protein product by sampling and identifying for the particular protein the amount of alkali required for initiating viscosity rise and the amount required for maximum viscosity in the resultant solutions, and selecting an alkali amount not over one-half between such respective amounts and extracting the material with an aqueous alkaline solution of that amount.

12. In a process of obtaining protein from vegetable protein-containing material by extracting leguminous seed-meal material with an aqueous alkali liquid to dissolve out the protein, correlating curd property in precipitation and viscosity-property in the finished protein product by sampling and identifying for the particular protein the amount of alkali for initiating viscosity rise and the amount required for maximum viscosity in the resultant solutions, and selecting an alkali amount about one-third between such respective amounts and extracting the material with an aqueous alkaline solution of that amount.

13. In a process of obtaining a protein from leguminous seed material by extracting with an aqueous alkaline solution, sampling and identifying for the particular protein the amounts of alkali required for initiating viscosity rise and the amount required for maximum viscosity in the resultant solutions, adjusting the alkali amount in the extract solution to not over one-half between such respective amounts, and precipitating the protein from such solution.

14. In a process of obtaining a protein from leguminous seed material by extracting with an aqueous alkaline solution, sampling and identifying for the particular protein the amount of alkali required for initiating viscosity rise and the amount required for maximum viscosity in the resultant solutions, adjusting the alkali amount in the extract solution to about one-third between such respective amounts, and precipitating the protein from such solution.

15. In a process of obtaining protein from leguminous seed residue by extracting the material with an aqueous alkaline solution, sampling and identifying for the particular protein the amount of alkali required for initiating viscosity rise and the amount required for maximum viscosity in the resultant solutions, and precipitating the protein from such solution with its alkali content adjusted to not over one-half between such respective amounts.

16. In a process of obtaining protein from leguminous seed residue by extracting the material with an aqueous alkaline solution, sampling and identifying for the particular protein the amount of alkali required for initiating viscosity rise and the amount required for maximum viscosity in the resultant solutions, and precipitating the protein from such solution with its alkali content adjusted to about one-third between such respective amounts.

17. In a process of extracting leguminous seed proteins, selecting the proportion of alkali to be used in the extraction of the protein from the leguminous seed protein-containing material by sampling and correlating a progressive range from smaller to larger amounts of extracting alkali with the viscosities of the protein as re-dispersed in alkaline solution, and selecting from this a proportion of extracting-alkali which will produce a final protein having a viscosity, when re-dispersed in alkaline solution, that is between the minimum viscosity obtained with the proteins extracted with the smaller amounts of extracting alkali and a viscosity which is one-third of the way from this viscosity toward the maximum viscosity obtained when the larger amounts of alkali are used.

18. In a process of extracting leguminous seed proteins, selecting the proportion of alkali to be used in the extraction of the protein from the leguminous seed protein-containing material by correlating the proportion of extracting alkali with the viscosities of the protein as re-dispersed in alkaline solution, by sampling with a progressive range from smaller to larger amounts of alkali, and selecting from this a proportion of extracting alkali which will produce a final protein having a viscosity, when re-dispersed in alkaline solution, that is between the viscosity at which the abrupt increase found for the proteins extracted with the smaller amounts of extracting-alkali sets in and a viscosity which is one-third of the way from such point of abrupt increase toward the maximum viscosity found when the larger amounts of alkali are used.

GLENN DAVIDSON.

REFERENCES CITED

The following references are of record in the file of this patent:

UNITED STATES PATENTS

| Number | Name | Date |
|---|---|---|
| 2,044,769 | Buron et al. | June 23, 1936 |
| 2,105,760 | Swallen | Jan. 18, 1938 |
| 2,174,438 | Corwin et al. | Sept. 26, 1939 |
| 2,194,835 | Nickerson | Mar. 26, 1940 |
| 2,230,624 | McLean | Feb. 4, 1941 |
| 2,304,099 | Julian et al. | Dec. 8, 1942 |

OTHER REFERENCES

Satow, "Researches on Oil and Proteid Extraction from Soy-Bean," Technology Reports of Tohoku Imperial University, Japan, pp. 81 to 83. (Copy in Div. 63.)

Certificate of Correction

Patent No. 2,431,993.                                                                                                December 2, 1947.

GLENN DAVIDSON

It is hereby certified that error appears in the printed specification of the above numbered patent requiring correction as follows: Column 6, line 14, after the word "material" insert *with an amount of alkali per weight of material extracted*; and that the said Letters Patent should be read with this correction therein that the same may conform to the record of the case in the Patent Office.

Signed and sealed this 24th day of February, A. D. 1948.

[SEAL]

THOMAS F. MURPHY,
*Assistant Commissioner of Patents.*